United States Patent Office 3,104,918
Patented Sept. 24, 1963

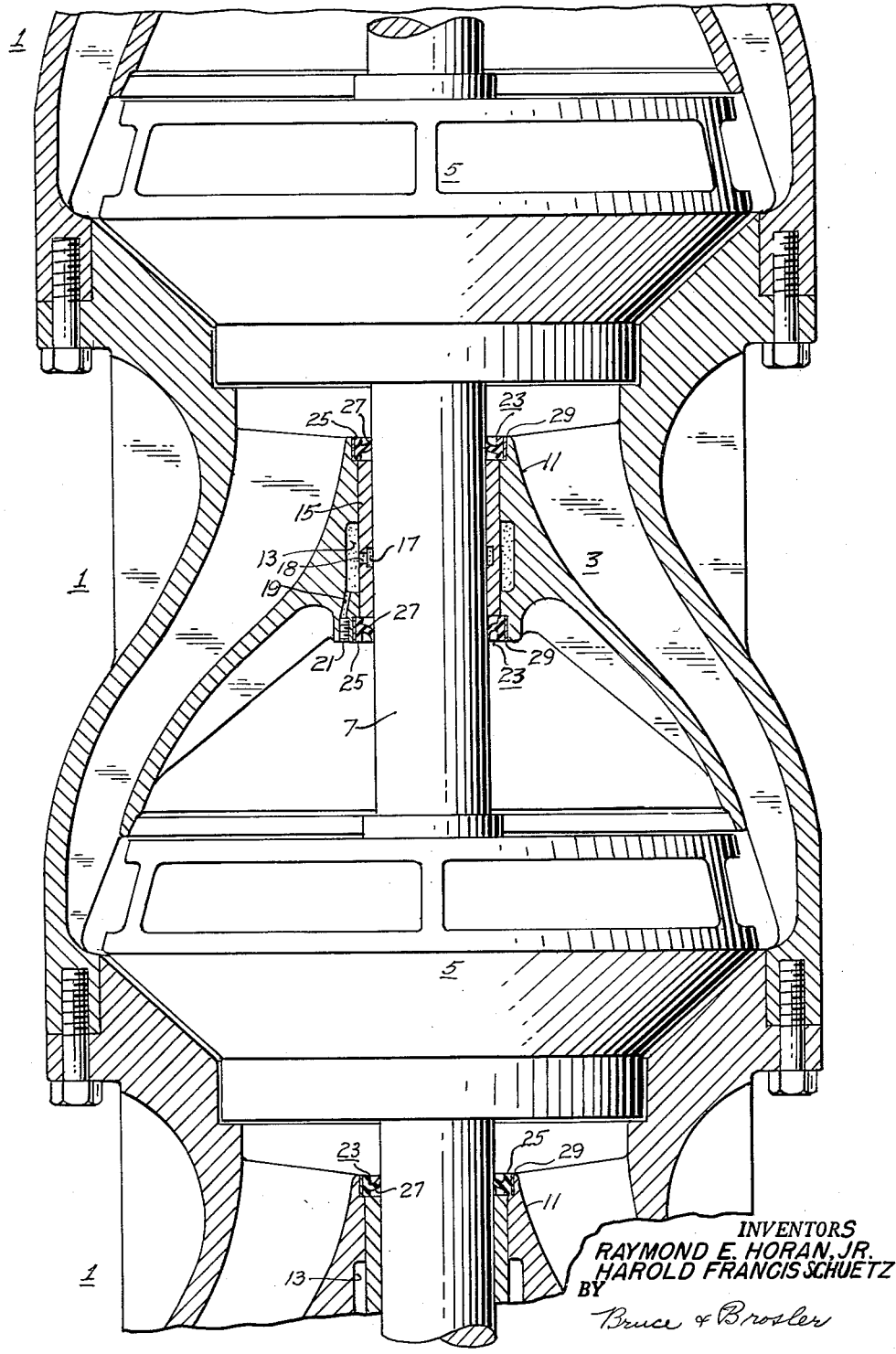

3,104,918
SHAFT SEALING MEANS FOR TURBINE TYPE PUMPS AND THE LIKE
Raymond E. Horan, Jr., El Cerrito, and Harold Francis Schuetz, Bakersfield, Calif., assignors to Jacuzzi Bros., Incorporated, Richmond, Calif., a corporation
Filed Aug. 21, 1961, Ser. No. 132,698
2 Claims. (Cl. 308—36.1)

Our invention relates to turbine type pumps, and more particularly to shaft sealing means therefor.

Turbine type pumps of the type to which the present invention relates, operate submerged in the water of the well in which they are located. In many localities, the soil may be sandy or the water may be hard, that is, it may contain chemicals such as the carbonates, which are capable under certain conditions of producing insoluble residues. Accordingly, it has been found that fine sand often gains access to bearings through which the pump shaft passes and rotates, and in localities where the water is hard, deposits of lime have been known to form in such bearings. In either event, pronounced troubles develop, which adversely affect operations of the pump, and ultimately result in the need for extensive repairs.

Among the objects of our invention are:
(1) To provide a novel and improved shaft sealing means for a turbine type pump;
(2) To provide a novel and improved shaft sealing means for a turbine type pump, which will effectively preclude access of sand to shaft bearings or the formation of lime deposits in such bearings;
(3) To provide a novel and improved shaft sealing means for a turbine type pump operating submerged, which sealing means, in addition to protecting a shaft bearing from sand and lime deposits or the like, will at the same time maintain lubrication of the shaft and its bearings.

Additional objects of our invention will be brought out in the following description of a preferred embodiment of the same, taken in conjunction with the accompanying drawings, wherein:

The FIGURE is a fragmentary view, for the most part in cross section, through a pertinent portion of a turbine type pump in which the invention is utilized.

Referring to the drawings for details of our invention in its preferred form, a turbine type pump involves one or more stages 1, each stage involving a bowl 3 and an associated impeller 5, all mounted on a common shaft 7. The bowls are designed to be bolted together and form a casing for the pump. The impellers are keyed to the shaft and rotate with it, while the bowls are stationary and provide bearing support for the shaft.

In accordance with the present invention, each bowl terminates at one end in a bearing housing 11 formed with an internal circumferential groove 13. Within said housing is a sleeve bearing 15 of a length sufficient to span the circumferential groove 13, the sleeve bearing being provided with a narrow internal circumferential groove 17 facing the shaft 7, the two grooves 13 and 17 being connected by a hole 18 in the sleeve bearing.

A lubrication passageway 19 through the wall of the bearing housing 11 and connecting with the circumferential groove 13 permits of the introduction of lubricant, such as a grease, into the circumferential groove, which functions as a reservoir to retain a supply of lubricant for the shaft 7 which passes through the sleeve bearing 15. A plug 21 threadedly secured in the entrance to the lubrication passageway 19 serves to retain such lubricant within the reservoir as provided by the circumferential groove.

At each end of the bearing housing 11, the housing is preferably counter bored or recessed to receive a seal 23, preferably one of the lip seal type which structurally involves a ring 25 of resilient material such as rubber, molded with an inwardly directed lip 27 of similar material, adapted to flex against the shaft. This seal is assembled about the shaft in such a manner that the pressures to which the lip will be exposed, will pressure the lip against the shaft, whereby the degree of sealing will be a function of the pressure to which the seal is exposed.

A backing ring 29 of metal is usually provided about the resilient ring of the seal, to facilitate the insertion and removal of such seals from the ends of the bearing housing.

The presence of the lubricant and the seals has, in practice, established an adequate safeguard against the entrance of fine sand into the shaft bearings or the formation of lime deposits therein, and accordingly has solved the problems formerly attributable to these causes.

From the foregoing description of our invention in its preferred form, it will be apparent that the same is subject to alteration and modification without departing from the underlying principles involved, and accordingly we do not desire to be limited in our protection to the specific details illustrated and described, except as may be necessitated by the appended claims.

We claim:
1. In a turbine type pump, a bowl having a bearing housing with a lubricant reservoir in the internal wall thereof, a sleeve bearing in said housing and spanning said reservoir for receiving and storing a supply of grease-type lubricant, said sleeve bearing having a hole through the wall thereof in the area of said reservoir to communicate with the same, a lubrication passageway through the end wall of said bearing housing facing the interior of said bowl, and connecting with said reservoir for the introduction of a supply of such grease-type lubricant into said reservoir, a pump shaft passing through said sleeve bearing, and a seal about said shaft at each end of said sleeve bearing.

2. In a turbine type pump, a bowl having a bearing housing with an internal circumferential groove, a sleeve bearing in said housing and spanning said circumferential groove to define a reservoir for receiving and storing a supply of a grease-type lubricant, said sleeve bearing having a hole through the wall thereof in the area of said groove to communicate with the same, a lubrication passageway through the end wall of said bearing housing facing the interior of said bowl, and connecting with said circumferential groove for the introduction of a supply of such grease-type lubricant into said bearing housing reservoir, a pump shaft passing through said sleeve bearing, a seal about said shaft at each end of said sleeve bearing, and means for closing said lubrication passageway following the introduction of such grease-type lubricant into said reservoir.

References Cited in the file of this patent
UNITED STATES PATENTS

| | | |
|---|---|---|
| 1,006,303 | Sloan | Oct. 17, 1911 |
| 1,159,504 | Krogh | Nov. 9, 1915 |
| 1,178,637 | Gregware | Apr. 11, 1916 |
| 1,328,234 | Krogh | Jan. 13, 1920 |
| 1,382,355 | Greiner | June 21, 1921 |
| 2,150,393 | Moulet | Mar. 14, 1939 |
| 2,258,834 | Willi | Oct. 14, 1941 |
| 2,428,411 | Davis | Oct. 7, 1947 |
| 2,518,338 | Lampe | Aug. 8, 1950 |
| 2,948,554 | Mahand | Aug. 9, 1960 |
| 3,012,829 | Marshall | Dec. 12, 1961 |

FOREIGN PATENTS

| | | |
|---|---|---|
| 355,346 | Germany | Aug. 5, 1919 |
| 636,398 | Great Britain | Apr. 26, 1950 |